Oct. 21, 1941. C. M. AKINS 2,259,789
HOOK FOR BUMPER JACKS OR THE LIKE
Filed Nov. 12, 1940
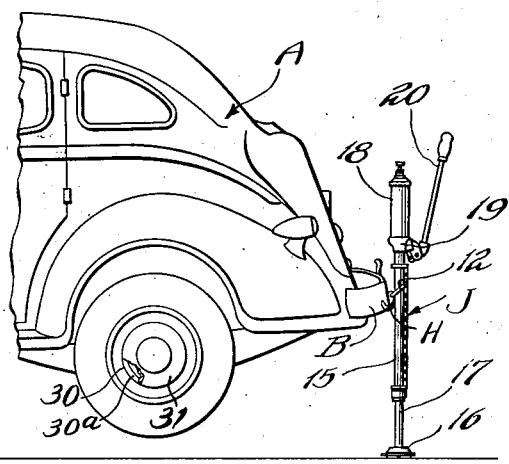
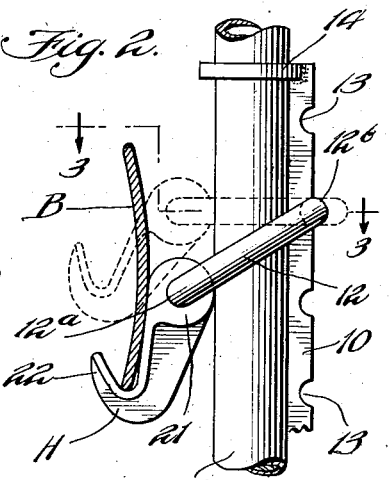
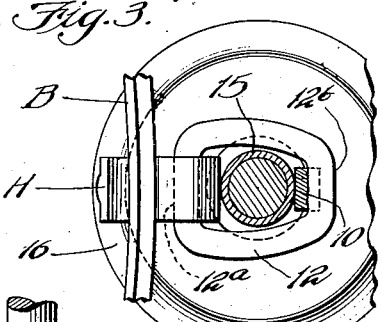
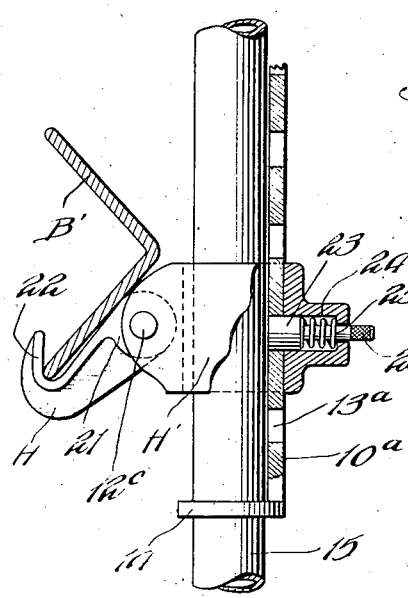
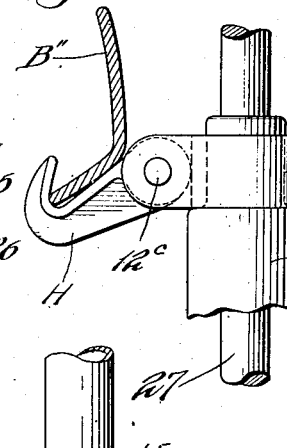
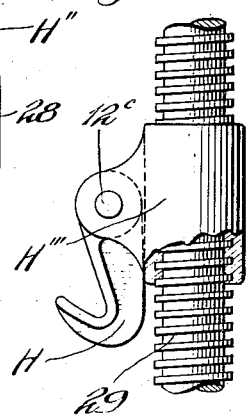
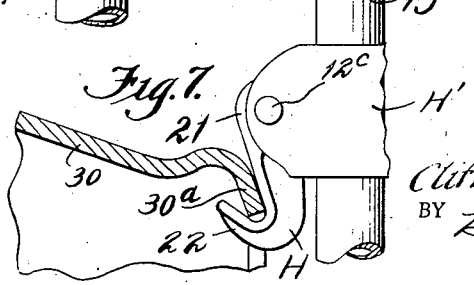
INVENTOR.
Clifford M. Akins
BY Bair & Freeman
ATTYS.

Patented Oct. 21, 1941

2,259,789

UNITED STATES PATENT OFFICE 2,259,789

HOOK FOR BUMPER JACKS OR THE LIKE

Clifford M. Akins, Minneapolis, Minn., assignor to Marquette Manufacturing Co., Inc., Minneapolis, Minn., a corporation of Minnesota Application November 12, 1940, Serial No. 365,322

10 Claims. (Cl. 254—134)

My present invention relates to a hook for engaging a bumper bar, a bumper supporting bar, a wheel hub or the like, and lifting the hook by means of a jack structure.

One object of the invention is to provide a hook structure of simple and inexpensive construction, adaptable for use on a great variety of jacks and for use in connection with a great variety of bumper bars or other elements of an automobile to be lifted and supported by the jack structure.

Another object is to provide a hook structure wherein the hook portion may engage various shapes of bumper bars, some of which have their lower edges spaced from their vertical surfaces against which a bumper jack is usually located, yet wherein the load imposed by the bumper on the jack is in all positions of adjustment of the hook substantially close to the side of the bumper jack.

Still another object is to provide a supporting hook which may be mounted on a jack and which is pivoted relative to the jack so that the hook portion may engage a lower edge of the bumper bar, whether such portion is close to the jack or remote therefrom, the hook being pivotally mounted and the pivot connection being closely adjacent the side of the jack.

A further object is to provide means for mounting the hook on the jack in such manner that it may be adjusted vertically with relation to the jack and may be swung around the jack, due to a swivel mounting of the hook on the jack.

Although my present invention is susceptible of a variety of embodiments, it is unnecessary to fully describe and illustrate more than a few such embodiments in order to give a full understanding of the invention both from its structural and functional standpoints. Accordingly, I have illustrated preferred and desirable embodiments of my bumper engaging hook whereby it is adapted to many different types of bumpers, as obvious from an inspection of the accompanying drawing forming a part of this specification and throughout the views of which like reference characters refer to similar parts.

In the drawing:

Figure 1 is a side elevation of a portion of an automobile with a hydraulic bumper jack in use to lift the rear end of the automobile and using my type of bumper engaging hook;

Figure 2 is an enlarged side elevation showing the hook structure coacting with the bumper bar, the bar being shown in section;

Figure 3 is a sectional view on the line 3—3 of Figure 2;

Figure 4 is a view similar to Figure 2 showing a modified construction wherein parts are shown in section to illustrate details of construction;

Figure 5 is a view similar to Figure 2 wherein my bumper engaging hook is designed for a friction type mechanical jack;

Figure 6 is another modified form illustrating my hook designed for a screw type jack, and Figure 7 is a sectional view through a wheel hub with the hub cap removed showing how my supporting hook may be hooked thereon for lifting the wheel of the automobile.

On the accompanying drawing I have used the reference character A to indicate generally an automobile and J a jack of the hydraulic or "bumper jack" type. My bumper or hub engaging hook includes briefly an elongated bar 10, a link 12 and a hook H. The bar is provided with a series of vertically spaced apart notches 13 and at its ends has a pair of rings 14 secured thereto as by welding. The rings 14 encircle a lifting element or sleeve 15 of the jack J whereby the bar 10 is swively mounted on the sleeve 15 so that it may be rotated to any desired position around the sleeve. The swivel mounting permits swinging of the hook and operating handle of the jack relative to each other so that the hook may properly coact with the part which engages and the operation of the handle will not be interfered with by some part of the automobile.

The jack J illustrated is of hydraulic type having a foot member 16, a plunger 17, the sleeve 15 constituting a cylinder for the plunger 17, and a reservoir 18. The reservoir 18 includes a pump 19 and a handle 20 is provided for operating the pump. The bumper jack J forms no part of my present invention and is shown merely by way of illustration.

The link 12 is in the form of a closed loop encircling the bar 10 and the lifting sleeve 15, as shown in Figure 3. The hook H has a hub part 21 and a hook part 22. The hub part 21 is perforated to receive a cross portion 12a of the link 12 whereby the hook is pivotally mounted relative to the link. The hook H is adapted to engage the bumper bar B of the automobile A, as shown in Figure 2.

The link 12 has a second cross piece 12b adapted to selectively engage the notches 13. The hook H may thereby be adjusted vertically relative to the lifting sleeve 15. To permit such adjustment, the link 12 normally assumes an inclined position as shown by solid lines in Figure 2. When the hook H is disengaged from the bumper B, the hook may be raised as to the dotted position, whereupon the cross member 12b of the link 12 may be disengaged from one notch 13 and the assembly of link and hook then slid vertically upward or downward as desired relative to the bar 10 and the lifting sleeve 15, and then engaged with another notch at the desired elevation.

In Figure 4, I show a modification wherein a hub H' takes the place of the link 12 and a bar 10a takes the place of the bar 10. The bar 10a is provided with openings 13a instead of notches, and the hub H carries a slidable latch pin 23 for selective coaction therewith. The pin 23 is slidable in a bore 24 and a spring 25 effects extension of the pin 23 to a position of coaction with one of the openings 13a. A hand engageable portion 26 of the pin 23 is provided to facilitate manual retraction of the latch pin relative to one of the openings 13a so that the hub H' may be vertically adjusted and latched in another desired position.

The hub H' carries a cross pin 12c serving as a pivot connection for the hook H relative to the hub H'.

In Figure 4, I show how the hook H may coact with a bumper bar B' of angle shape rather than the shape shown in Figure 2. If the hook H were rigid instead of pivoted, the hook 22 thereof would be so far from the side of the lifting sleeve 15 that the overhang would be objectionable because of exerting a binding or twisting effect on the lifting sleeve. By having the hook H pivoted, however, it may be swung out to engage the lower edge of the irregular shaped bumper bar B', yet the load of the automobile and the bumper bar will be imposed on the jack structure close to the lifting sleeve, as such load will always be imposed on the pivot 12c. The desirability of a pivoted hook is therefore evident.

In Figure 5, a hub H'' is shown to replace the hub H' of Figure 4 or the link 12 of Figure 2 when it is desirable to use my bumper engaging hook on a jack of the "friction" type. A friction type jack usually includes a vertical supporting rod 27 and a lifting sleeve 28 slidable thereon with clutch devices (not shown) for holding the sleeve at any position and effecting raising or lowering of it relative to the rod 27. The bumper bar B'' in Figure 4 is still a different shape and requires swinging of the hook H to a further outward position, yet the load is still imposed on the pivot point 12c. The hub H'' is rotatably mounted so as to facilitate proper positioning of the hook on the rod 27.

As shown in Figure 6, my bumper engaging hook is adaptable for screw type jacks by providing a hub H''' so designed as to coact with the threads of a rotatable supporting rod 29. Such types of jacks are operated by merely rotating the threaded rod 29 in the proper direction for raising or lowering the hook H in an obvious manner.

In Figure 7 I show how my supporting hook may coact with a part of the automobile other than the bumper. Such part shown in this figure is the hub 30, from which the hub cap has been removed. The cap is shown at 31 in Figure 1. My supporting hook H may be readily hooked under the upper edge of the outer flange 30a of the wheel hub 30 and operated to lift the wheel of the automobile, after which a block may be set under the axle and the jack lowered and removed to gain access to the tire.

From the foregoing disclosure, it is evident that I have provided a hook that is designed for engaging different shapes of bumper bars, bumper supporting bars, wheel hubs or other devices and lifting them with relation to a jack. The jack may assume any one of a variety of designs, yet my hook structure is readily adaptable to any one of such designs, as illustrated in the various figures of the drawing. In operation the hook may be readily engaged with the lower edge of a bumper bar or the like for effectively gripping the bar and lifting it without any danger of slippage. The load is always imposed close to the lifting element of the jack and the undesirability of a rigid hook required at a considerable distance from the lifting element, with the attendant undesirable overhang, is eliminated.

In accordance with the provisions of the patent statutes, I have described the principle of operation of my invention together with an illustration of hooks for bumper jacks or the like which I consider to represent the best embodiments thereof, but I desire to have it understood that the structure disclosed is only illustrative and that the invention may be carried out by other means within the scope of the appended claims.

What I claim as new and desire to secure by Letters Patent of the United States is:

1. A bumper engaging hook for bumper jacks comprising an elongated element swivelly mounted on a vertically elongated lifting sleeve of the jack, said elongated element having a series of vertically spaced notches, a link surrounding said elongated element and lifting sleeve, said link being engageable selectively in the notches thereof, a hook pivoted to said link and depending from the pivot point and adapted to engage under the edge of a bumper bar or the like spaced from said lifting sleeve, the pivotal mounting permitting swinging of said hook away from the lifting sleeve to permit proper and effective coaction with the bumper bar at such spaced position with the load imposed on the pivot connection substantially close to the lifting sleeve in all positions of the hook, said link hanging at a downwardly inclined angle from the notch in which it is engaged to keep the imposed weight close to the lifting sleeve but permit swinging of the link to a level position to disengage one notch whereby the link may be moved to another notch and engaged therewith.

2. A bumper engaging hook comprising an elongated element swivelly mounted on a vertically elongated lifting sleeve of a bumper jack structure or the like, said elongated element having a series of vertically spaced notches therein, a link surrounding said elongated element and lifting sleeve, said link being engageable selectively in the notches thereof, and a hook pivoted to said link and depending from the pivot point and adapted to engage under the edge of a bumper bar or the like spaced from said lifting sleeve, the pivotal mounting permitting swinging of said hook away from the lifting sleeve to permit proper and effective coaction with the bumper bar.

3. In a vertically adjustable jack element and a bumper-engaging hook comprising a bumper jack structure, a loop vertically adjustable on the jack element and a separate hook member pivoted to said loop and depending from the pivot point, said hook having a plurality of operative positions relative to the loop and adapted to engage under the edge of bumper bars or the like having different shapes.

4. A bumper engaging hook comprising an elongated element swivelly mounted on a lifting jack structure, said elongated element having a series of spaced openings therein, a hub surrounding said elongated element and lifting sleeve, said hub being vertically slidable on said elongated element and lifting sleeve, a latch pin carried by said hub for selective coaction with the openings of said elongated element, a spring normally extending said latch pin to a position of coaction with one of said openings, said latch pin having a hand engageable portion to facilitate retraction of said latch pin relative to said opening against the bias of said spring, a hook pivoted to said hub and depending from the pivot point and adapted to engage under the edge of a bumper bar or the like spaced from said lifting sleeve, the pivotal mounting permitting swinging of said hook away from the lifting sleeve to permit proper and effective coaction with the bumper bar at such spaced position with the load imposed on the pivot connection substantially close to the lifting sleeve in all positions of the hook.

5. A bumper engaging hook for bumper jack structures or the like comprising an elongated element and lifting sleeve vertically arranged to be elevated by the jack structure, said elongated element having a series of spaced openings therein, a hub surrounding said elongated element and lifting sleeve, said hub being vertically slidable on said elongated element and lifting sleeve, a latch pin carried by said hub for selective coaction with the openings of said elongated element, and a hook pivoted to said hub and depending from the pivot point and adapted to engage under the edge of a bumper bar or the like.

6. A bumper engaging hook for a bumper jack structure or the like comprising a supporting element mounted on a lifting element of the jack, a link surrounding said supporting element and said lifting element of the jack, said link being engageable in a notch of said supporting element for support therefrom, a hook pivoted to said link and depending from the pivotal point and adapted for its hook member to engage under the edge of a bumper bar or the like spaced from the lifting element, the pivotal mounting permitting swinging of the hook away from the lifting element for proper and effective coaction with the bumper bar at such spaced position with the load thereof imposed on the pivot connection substantially close to the side of said lifting element.

7. In a lifting hook for jack structures, a member including a movable element having predetermined positions of adjustment vertically on the jack structure and a hook pivoted thereto and depending from the pivot point and adapted to engage under the edge of a portion of the automobile so as to effect lifting of such portion from a point determined by the pivotal connection.

8. In a lifting jack structure a vertical lifting element movable up and down, an automobile engaging member including a hub surrounding and attached to said lifting element, a hook and a pivot pin extending transversely relative to the hub at one side thereof spaced from said lifting element and pivotally securing the hook to the hub at a point spaced from the lifting element for movement throughout a plurality of positions, and a point on said hook extending in a general upward direction for all positions of said hook.

9. In a jack structure a vertical lifting member movable up and down and an automobile engaging member including a hub surrounding said lifting member having movement relative thereto limited to vertical and rotational movement, a hook element for engaging a part of an automobile and a horizontal pivot extending transversely relative to the lifting member at one side thereof pivotally securing the hook to the hub at one side and spaced from the exterior surface of the lifting member, said hook having a plurality of positions of adjustment for engaging said automobile.

10. In a lifting jack structure a vertically movable member, an element extending vertically relative to said member having a series of anchoring means spaced at predetermined vertical intervals therealong, and a lifting member comprising a hub member including a portion thereof releasably engageable with said anchoring means and shiftable from one to another, and a hook having a tip extending in a general upward direction in all positions of adjustment pivotally secured to the hub on the side opposite the portion thereof engaging said anchoring means.

CLIFFORD M. AKINS.